Aug. 29, 1933.  L. ZACHARA  1,924,672
COMBINATION CIRCULAR SAW MITER MACHINE
Filed May 31, 1930   3 Sheets-Sheet 1

INVENTOR
BY *Ladislaus Zachara*

ATTORNEY

Aug. 29, 1933.　　　L. ZACHARA　　　1,924,672
COMBINATION CIRCULAR SAW MITER MACHINE
Filed May 31, 1930　　　3 Sheets-Sheet 2

INVENTOR
BY Ladislaus Zachara
ATTORNEY

Aug. 29, 1933.  L. ZACHARA  1,924,672
COMBINATION CIRCULAR SAW MITER MACHINE
Filed May 31, 1930   3 Sheets-Sheet 3
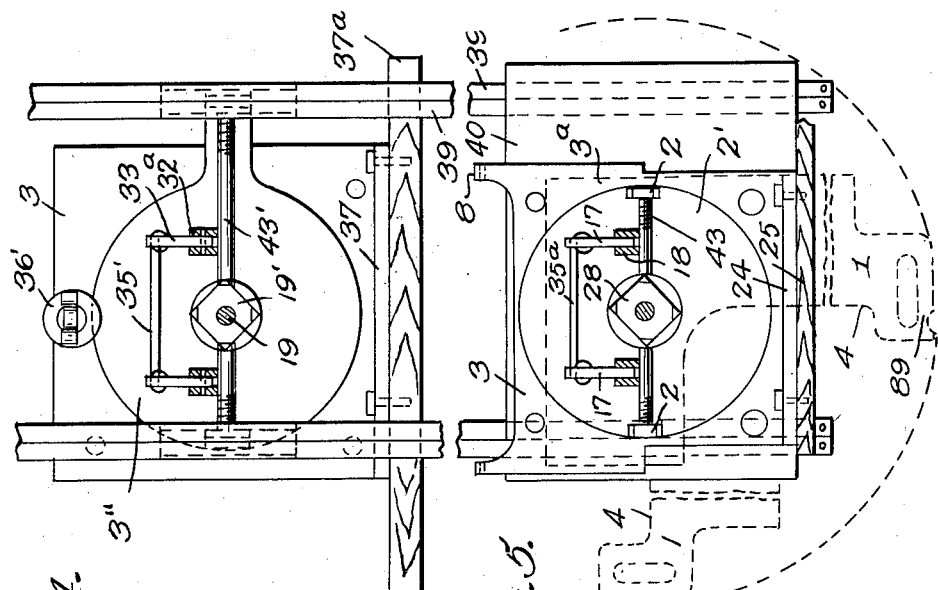
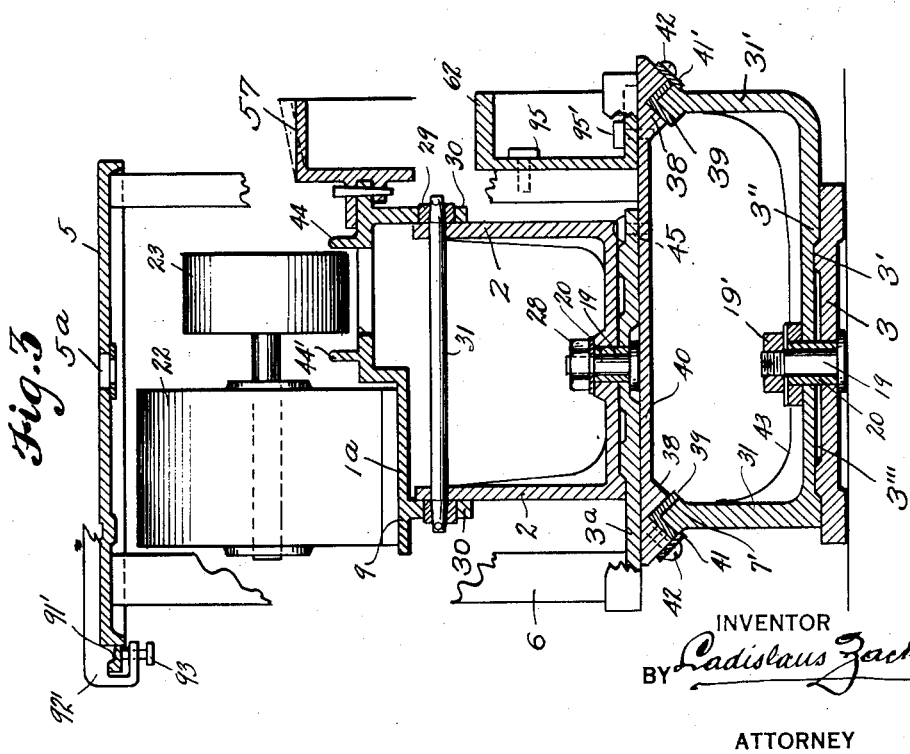
INVENTOR
*Ladislaus Zachara*
BY
ATTORNEY

Patented Aug. 29, 1933

1,924,672

UNITED STATES PATENT OFFICE 1,924,672

COMBINATION CIRCULAR SAW MITER MACHINE

Ladislaus Zachara, Bremerton, Wash.

Application May 31, 1930. Serial No. 458,116

21 Claims. (Cl. 143—6)

This invention relates to improvements in wood working machines, and more particularly to a portable, power driven saw adapted for right or left hand mitering, cutting off, squaring, dadoing of concave or convex surfaces, tenoning, grinding or ripping; the principal object of the invention being to provide a relatively inexpensive bench machine of the above character whereby the various operations mentioned, and others, may be easily, quickly and economically done.

Other objects of the invention reside in the various details of construction and the combination of parts and in their mode of operation as will hereinafter be fully described.

In accomplishing these and other objects of the invention, I have provided the improved details of construction, the preferred forms of which are illustrated in the accompanying drawings, wherein—

Fig. 3 is a vertical cross section taken on line 3—3 in Fig. 1.

Fig. 4 is a plan view of the lower base unit.

Fig. 5 is a plan view of the upper base unit.

Figure 1:
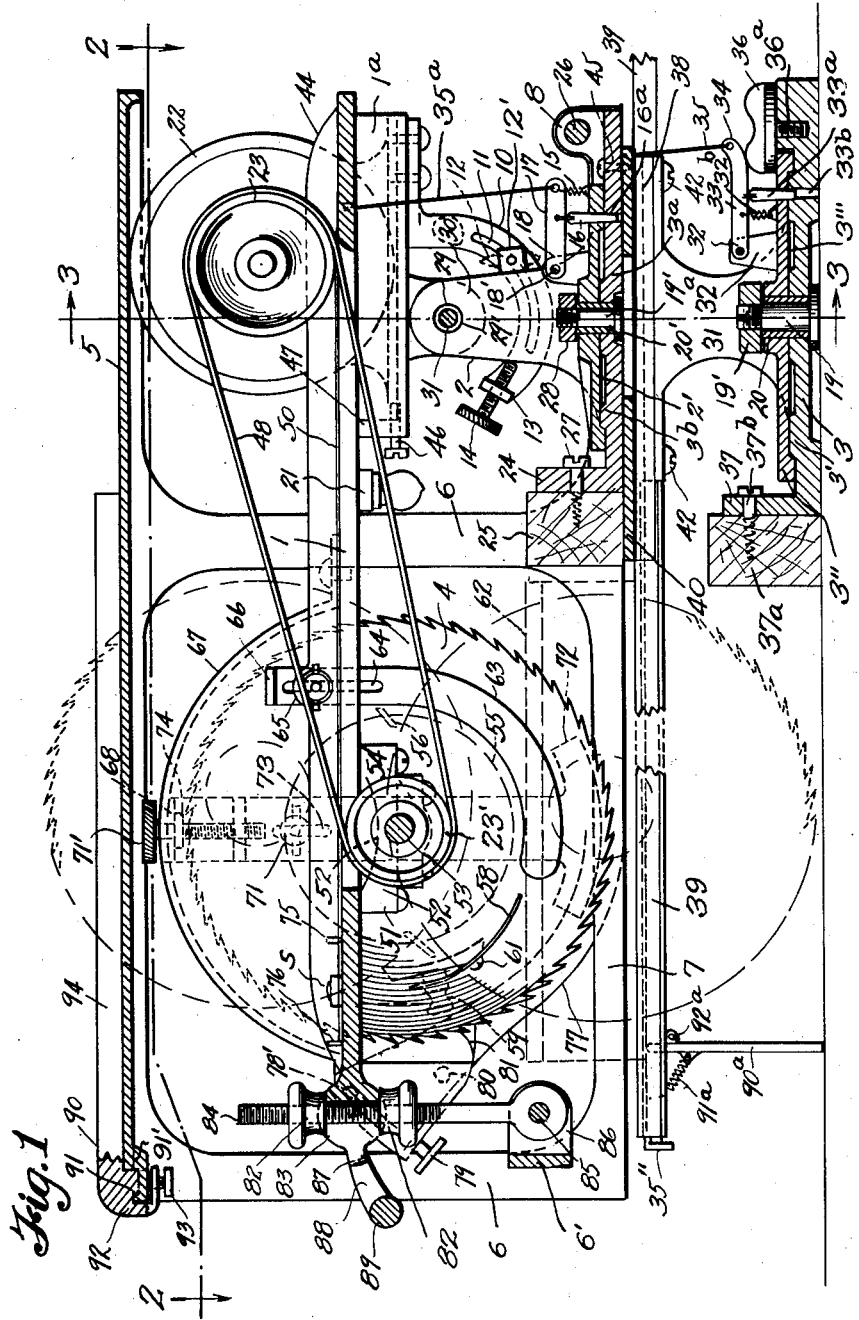
Fig. 1 is a central, vertical section longitudinally of the machine, showing in dotted lines different positions of the saw.

Referring more in detail to the several views of the drawings—

The movable parts of the present machine are mounted upon a lower base unit comprising a bed plate 3 which is designed to rest flatly upon and, if desired, to be fixedly attached to a supporting surface such as a bench top. The bed plate is formed on its upper surface with an annular, conically tapered rib 3′ about and upon which the base plate 3″ of a base frame structure is rotatably fitted. The plate 3″ has a circular countersink 3‴ in its under side fitted about the rib 3′ to retain the parts against relative displacement and the plate 3″ is rotatable about a cylindrical pivot sleeve 20 that extends vertically through the bed plate 3 and the base plate 3″, and a bolt 19 having a headed lower end and a nut 19′ threaded onto its upper end, is threaded upwardly through the sleeve to hold the plate against upward displacement but is permitted to rotate freely about the sleeve upon the plate 3. The countersink of the plate 3″ has its inner edge beveled to correspond to the bevel of the outer surface of the rib 3′ and this provides for an automatic take-up of any looseness that might occur incident to wear on the engaging surfaces; there being a slight clearance provided between the horizontal surfaces of these parts.

The bed plate 3 has an integral, upturned flange 37 at its forward edge to which a rail 37a of a suitable or desirable length is fixedly attached by screws 37b extended through the flange. This rail, which preferably is of wood, serves as a gauge or abutment against which pieces to be worked on may be placed and held for squaring off or for angular cutting as will presently be described.

The lower base unit, as disclosed best in Fig. 3, has standards 31—31′ at its opposite side edges integral with the base plate 3″ and these standards, at their upper ends, have horizontally directed and parallel tracks or rails 39 fixed thereto which extend, as shown in Fig. 1, across and beyond the gauge rail 37a and at their outer ends have supporting legs 90a pivotally hinged thereto as at 92a and yieldingly held in place by springs 91a attached thereto and to the rails 39.

Upon the parallel guide rails 39 a base or platform 40 of an upper base unit is mounted for sliding adjustment therealong. The two guide rails in this instance are rigid by reason of an inverted V-form in cross section and the base plate 40 is provided on its under side at opposite edges with ribs 38 formed with downwardly facing grooves which receive the ridges of the rails in a sliding fit that insures against looseness. The base plate is held on the rails against upward displacement by means of flange plates 41—41′ that are fastened to the ribs by screws 42 in such manner that they longitudinally underlap the rails in a sliding connection as seen in Fig. 3. This permits the upper base unit to be adjusted lengthwise to any position along the rails 39—39 and these may extend to any desired distance both forwardly and rearwardly of the lower base structure. The base structure, including the base plate 3″, the standards 31—31′ and the rails 39 also is rotatably adjustable in a horizontal plane about the pivot sleeve 20 and it may be held at any selected position by the tightening thereagainst of a wing nut 36 that has a shank 36a threaded into the base member 3 so that the nut overlaps the base plate 3″. A locking pin 33a is arranged for projection through an opening in the base plate 3″ into any one of a series of holes 33b formed in the bed plate 3 at equal radial distances form the pivot bolt 19 thus to locate and retain the frame structure at certain definite positions. These holes are preferably located so that the rails 39 may readily be located at a right angle to the direction of the guide bar 37a and also at the various conventional angles such as thirty, forty five and sixty degrees. The pin 33a is operatively connected at its upper end to a release lever 33 which, in turn, is pivotally attached as at 32, to a post 32a on the plate 3''. A spring 32b is connected to this lever and to the base plate to draw downwardly on the lever thus to retain the pin seated, but the lever may be lifted to unseat the pin for adjustment of the base by means of a cable 35' which is attached to and extends upwardly from the outer end of the lever then through a horizontal channel provided therefor in the standard 31 and forwardly along the rail 39 to the forward end thereof where it is provided with a pull member 35''. This cable is provided in order that an operator when working at the forward end of the machine may easily make an adjustment without having to reach with the hand back and under the upper base unit.

Mounted upon the base plate 40 of the upper base unit is a bed plate 3a secured thereto by a plurality of screws 45. This plate 3a is of the same general character as the plate 3 and is provided along its forward edge with an upturned flange 24 to which a wooden rail 25 is fastened by screws 27. This rail serves as a gauge and stop against which pieces may be placed for cutting off at various angles as presently set forth.

Pivotally mounted upon the bed plate 3a is the base 2' of the upper base unit. This is rotatable as in the unit below, about a sleeve 20' and is held in place by a headed bolt 19' that extends upwardly through the bed plate 3a and base 2'. A nut 28 is threaded onto the bolt to retain the plate 2' against upward displacement. Also, the plate 2' has a circular, beveled edge recess in its under side concentric with the bolt 19' and this recess fits down over a beveled circular rib 3b on the bed plate 3a. The plate 2' may be adjusted about this rib to different positions and then held at any position of adjustment by a tapered pin 16 that extends downwardly through an opening provided therefor in the plate 2' and into any one of a plurality of holes 16a provided in the base plate at equal distances radially from the pin 19 to receive it. The pin 16 is also operatively attached at its upper end to a release lever 17 that is pivotally attached, as at 18', to a post 18 formed on the plate 2'. A release cable 35a is attached to this lever and it extends therefrom and forwardly to a position easily accessible to the operator of the machine.

Figure 2:
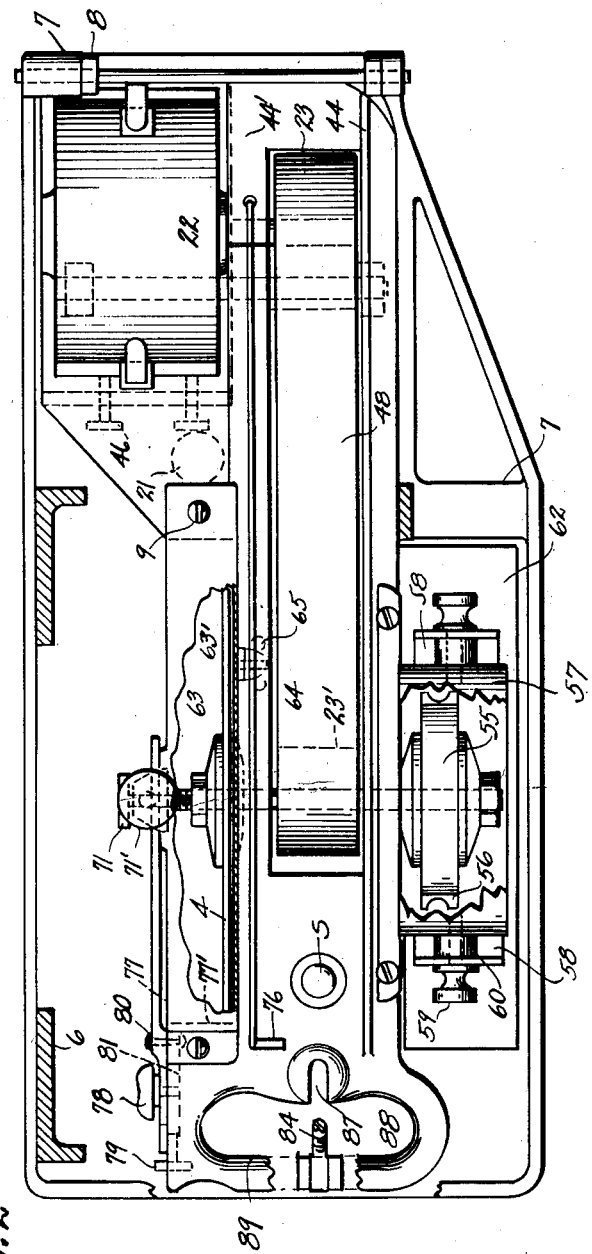
Fig. 2 is a plan view substantially in the horizontal plane of the line 2—2 in Fig. 1.

Formed integral with the base plate 2' at its opposite sides are standards 2—2 as seen in Fig. 3, and hingedly mounted thereby is an arm or support 1. This arm is mounted by a hinge pin 31 which extends through the upper ends of the standards and through depending ears 30—30 cast on the under side of the arm near its opposite edges. This arm, at its mounting end, is formed at one side with a downwardly offset table 1a on which a small electric motor 22 is adjustably mounted. The motor has a pulley wheel 23 mounted on its shaft and a belt 48 extends about the pulley 23 and also about a pulley wheel 23' that is fixed on a transversely directed arbor 53 that is rotatably mounted in bearings 54 fixed to the under side of the arm near its outer or swinging end. A slot is provided lengthwise of the arm for the passage of the belt therethrough. A circular saw 4 is removably mounted on one end of the arbor at one side of the arm and, as seen in Fig. 2, a cutter head 55 mounting knives 56 is removably mounted on the opposite end of the arbor. The cutter shown is representative of many similar devices which may be used interchangeably on the arbor for various operations such as for making mouldings, for tenoning, shaping or grinding.

A guard 57 is fixed to the arm to overlie the cutter and to this guard, as seen best in Fig. 2, there are hold-down springs 58 adjustably fastened by set screws 59. The position of one of these springs is shown in Fig. 1 as extending about the forward edge of the cutter and is held by a screw 61 with the adjusting screw 59 extended through its upper end and also through a rubber block that is placed between the spring and mounting so as to give a certain desired resiliency to the connection.

Fixed on the bed plate 40, as seen in Fig. 3, and extended beneath the cutter head 55 is a platform 62 or what may be called a moulder bed across which work may be placed and fed to the cutter head. This platform is held in place by screws or the like 95'. In some instances a short bed may be more desirable and this would be located as seen in dotted lines in Fig. 1 and attached to the side members or legs 6 of a table 5 overlying the structure as will presently be described.

Fixed to the underside of the platform 9 on which the motor is mounted is a bracket 10 that has an end curved circularly about the hinge shaft 31 and it passes closely along one of the standards 2 and has a laterally turned end portion 13 through which a set screw 14 is threaded to engage with the standard on one side to limit the downward swing of the free end of the arm. This bracket has an arcuate slot 11 extended along it and a set screw extends through the slot and is threaded into a nut 12' that may be adjusted against the side of the standard opposite the set screw 14. Thus by adjustment of the set screw and nut the arm may be limited in movement or may be rigidly locked at any set position. With the screw 14 adjusted outwardly to its limit and the nut 12' moved to the upper end of the slot, the arm will have a free swinging movement through a considerable arc so that the saw may be adjusted upwardly or downwardly as to the dotted line position of Fig. 1.

Overlying the saw arm is the platform or table 5. This is perfectly flat with opposite side frames comprising the vertical legs 6 and the connecting bars 7. The table frame is hingedly attached to the rear end of the plate 3a by a hinge pin 26 extended through upstanding ears 8 on the plate 3 and through the rear ends of the base bars 7. In normal position the table 5 horizontally overlies the saw arm and saw, as in Fig. 1, and it is provided with a longitudinal slot 5a through which the saw may be lifted. The saw arm may be fixed relative to this table by a bolt 84 which is pivotally mounted at its lower end by a pin 85 between spaced ears 86 formed on a front end cross piece 6' of the table frame. This bolt 84 extends upwardly and has nuts 82—82 threaded thereon to engage opposite sides of a spherical head 83 formed on the swinging end of the arm. The engaging surfaces of these nuts are shaped to fit the spherical surface of the head and by adjusting them along the bolt the arm may be adjusted and held at any set position with respect to the amount of extension through the table slot 5a; it being understood that when the saw is operated through the table slot, the guard 67 would be removed from the arm. As seen in Fig. 2, the arm has a handle 89 at its end and an opening 88 providing a hand hold. The bolt is arranged to extend through the opening 88 and a slot 87 is extended therefrom into the head 83 to seat the bolt 84 for the clamping and adjustment of the arm by the manipulation of the nuts 82—82.

Should it be desired to use the saw independently of the platform 5, the bolt 84 is then detached from the end of the arm 1 to permit the platform to be swung upwardly and rearwardly about the hinge pin 26 to a position entirely clear of the mechanism.

When the parts are arranged as in Fig. 1, the platform and saw arm may be adjusted to different angular positions about the pivot 19' upon releasing the locking pin 16. For doing this I have provided the releasing cable 35a which extends from the releasing lever 17 upwardly through the arm then forwardly therealong and at a position adjacent the hand hold of the arm has a handle 76 attached thereto. Also a switch S may be located at the outer end of the arm for controlling the motor circuit and this could be in series circuit with an electric lamp 21 mounted on the underside of the arm to illuminate the work being done; this lamp being located rearwardly of the saw and in a position to illuminate the work along the plane of the saw.

Adjustment of the motor forwardly or rearwardly may be done to tighten the belt by the manipulation of adjusting screws 46 threaded through the table flange against or into the motor base plate.

Formed along the left hand side edge of the platform, as in Fig. 3, and along the front end edge, as in Fig. 1, is a groove 91 with a square cut inner wall and beveled outer wall. A gauge bar 94 is applied to the table and has a boss 91' applied to the groove and a flange underlying the table edge with a set screw 93 therethrough to clamp the bar at any set position. The boss when seated in the slot by tightening of the screw firmly holds the bar at a right angle to the edge of the table at the place of application.

Associated with the pivoted saw arm is what is called the inside depth gauge 63. This is adjustably fixed to the arm by a set screw 65 to extend downwardly at one side of the saw and it has a forwardly rounded lower end portion as seen in Figure 1. Vertical adjustment of the gauge is made by loosening the screw and then effecting adjustment by use of a laterally turned handle 66 on the upper end of the gauge. A longitudinal slot 64 in the gauge receives the set screw therethrough and permits the adjustment. At the other side of the saw is a gauge 77 adjustably fixed by a pivot 80 to a bracket 81 that is attached to the outer end of the saw arm. This latter gauge is adapted to be adjusted to different positions relative to the bottom edge of the saw by a set screw 79 that is mounted in the bracket and engaging with the inner end of the gauge member. The two gauges 63 and 77 disposed at opposite sides of the plane of the saw are adapted for use in right or left hand rabbeting, and the one that is in use may be adjusted against the piece being worked on to limit the depth of the saw cut.

There is also a two-way holding arm 69 adjustably mounted upon the side of the saw guard 67. This is employed for holding material against the gauge 24 and has an adjusting screw 68 for raising or lowering. At the lower end of the gauge is a yieldable shoe 72 adapted to bear yieldingly against the part worked on. A set screw 71 extended through a slot 73 in the gauge and threaded into the mounting piece is tightened to hold the gauge at any set position.

Assuming that the device is constructed as described and illustrated, it is used as follows: For squaring off or cutting boards of some width, they are placed against the gauge rail 37a, then the machine is rotatably adjusted about the pin 19 to a desired angular position for the cut. The entire upper frame structure may then be moved slidably along the rails 39—39 while the saw is in a lowered position to thus cut off the piece. If desired the depth gauge 63 may be used to limit the depth of the cut made. By employing rails of considerable length boards of considerable width may be accommodated. Also, the pivotal movement of the frame permits angular cuts of any degree to be made.

If it should be so desired the entire upper structure may be dismounted from the rails 39—39 and used independently of the lower structure. In such event the cutting off is done by placing the piece to be cut against the rail 25 and swinging the saw downwardly thereagainst. Bevels or angular cuts of any degree may be made by pivotal adjustment of the structure about the pivot pin 19'. In this use of the saw it would be released from the holding bolt 84 and its movement limited to any desired extent by the proper adjustment of the set screw 14 and nut 12' carried by the bracket 10. The gauges 63 and 72 also would be used here for various cutting, grooving and shaping operations.

When the platform is in use the saw is set at a definite position, as shown in dotted lines, to extend upwardly through the table slot, then the work is fed thereto across the top of the table. If desired the gauge piece 94 may be used for squaring up the piece and this gauge may be applied along the side or end of the table. If the platform is not desired, it may be swung upwardly and rearwardly out of the way.

For work on mouldings, pieces may be prepared from boards cut in strips by using the saw as a ripper. Then the strips would be fed across the moulder table and against the cutter head of proper selection. Tenoning also is done on the moulder bed by the use of the proper cutter head. Various operations other than those herein described may be performed on the machine and it is not to be understood that the machine shall be limited to any special manner of use or any special operations. Furthermore it is understood that changes might be made in the various details of construction without departing from the spirit of the invention.

Having thus described my invention, what I claim as new therein and desire to secure by Letters-Patent is—

1. In a machine of the character described, a bed plate, a gauge rail fixed rigidly along one edge thereof, a vertical pivot fixed in the bed plate, a base plate resting upon the bed plate and rotatably adjustable about the vertical pivot, a rigid arm hingedly mounted on the base plate and extending substantially horizontally across the said gauge rail and movable vertically at its extended end, a circular saw operatively mounted at the swinging end of the arm and adapted by downward swinging action of the latter to cut through pieces placed against the gauge rail.

2. In a machine of the character described, a bed plate, a gauge rail fixed rigidly along one edge thereof, a vertical pivot fixed in the bed plate, a base plate resting upon the bed plate and rotatably adjustable about the vertical pivot, a rigid arm hingedly mounted on the base plate and extending substantially horizontally across the said gauge rail and movable vertically at its extended end, a circular saw operatively mounted at the swinging end of the arm and adapted by downward swinging action of the latter to cut through pieces placed against the gauge rail, means adjustably fixed to the arm and engageable with the arm support to limit the movement of the arm upwardly and downwardly.

3. In a machine of the character described, a bed plate having an integral flange at one side, a gauge rail fixed rigidly thereto, a base mounted for rotative movement on the bed about a vertical pivot, an arm hingedly attached upon the base to swing in a vertical plane and extending across the gauge rail, a transverse arbor mounted in the end of the arm, a circular saw mounted on the arbor for cutting pieces disposed against the gauge rail, means on the arm for driving the arbor, adjustable means for limiting movement of the arm upwardly and downwardly and for holding it at set positions and means on the base engageable with the bed plate for locking the base at different positions of its rotative adjustment.

4. In a machine of the character described, a bed plate having an integral flange at one side, a gauge rail fixed thereto, a base mounted for rotative movement on said bed plate about a vertical axis, standards on the base, an arm hingedly supported by the standards to swing in a vertical plane and extending across the gauge rail, an arbor mounted transversely of the arm at its end, wood working tools on the arbor for operation on pieces disposed against the gauge rail, a motor mounted on the arm to drive the arbor and a handle at the end of the arm whereby the arm may be raised and lowered and the base rotatably adjusted.

5. A machine of the character described comprising a bed plate formed at its front edge with an upturned flange and having spaced ears thereon at its opposite edge, a bar fixed to the flange, a base mounted on the bed plate for rotative adjustment thereon about a vertical pivot, standards formed on the base, an arm hingedly supported by the standards to swing in a vertical plane, said arm extending across the gauge flange and bar, an arbor mounted in the arm near the outer end, a motor mounted on the arm at its inner end, means operatively connecting the motor with the arbor, a circular saw mounted on the arbor, releasable locking means for securing the base at different positions of its rotative adjustment and a handhold at the swinging end of the arm whereby it may be raised or lowered or the base rotatably adjusted thereby.

6. A device as in claim 5 wherein a saw table overlies the arm and is provided with a slot for passing the saw when the arm is in a plane perpendicular to the gauge bar.

7. A device as in claim 5 wherein a saw table overlies the arm and has a slot for passing the saw upwardly therethrough when the arm is extended in a direction at right angles to the vertical plane of the gauge bar, and adjustable means is provided on the table for supporting the arm to retain the saw at a set position relative to the table.

8. A device as in claim 5 wherein a saw table horizontally overlies the arm and is provided with a slot for passing the saw upwardly therethrough and adjustable means is provided on the arm for engaging the standards to sustain the saw at a definite position within the slot of the table.

9. A bed plate, a gauge rail fixed thereto, a base mounted thereon for rotative adjustment about a vertical pivot, a pair of standards on the base, an arm hingedly mounted by the standards to swing in a vertical plane across the gauge rail, an arbor transversely mounted at the swinging end of the arm, a motor mounted upon the hinged end of the arm for driving the arbor, a circular saw on the arbor for operation on pieces disposed against the rail, and a saw table adapted to horizontally overlie the arm and provided with a slot for passing the saw upwardly therethrough, said arm having a hand hold at its swinging end for moving it to different positions, and said table being hingedly mounted on the base to permit its being swung rearwardly to a position removed from the saw.

10. A device as in claim 9 wherein an arm adjusting and supporting bolt is pivotally attached to the table frame and adapted for adjustable connection with the arm to hold it rigidly at a set position.

11. A device of the character described including a base, rails rigidly mounted thereon, a gauge bar fixed to the base beneath the rails, a bed plate slidably movable along the rails, an arm hingedly mounted upon the bed plate to swing in a vertical plane, a driven, circular saw mounted by the swinging end of the arm.

12. A device as in claim 11 wherein the rail supporting base is rotatably adjustable about a vertical pivot to change the angular relationship of the rails to the gauge bar.

13. A device as in claim 11 wherein the rail supporting base is rotatably adjustable about a vertical pivot to change the angular relationship of the rails to the gauge bar and releasable means is provided for locking the rotatable base at definite angular positions, and has releasing means operable from the ends of the rails.

14. A device as in claim 11 wherein the rails have supporting legs yieldably mounted at their outer ends and which may be displaced for passing material beneath the rails but will automatically assume their functional position.

15. A device of the character described comprising a lower bed plate, a gauge bar fixed thereto, a base mounted on the bed plate for rotative adjustment about a vertical pivot, releasable means for locking it at different positions of adjustment, a pair of parallel, horizontally directed rails mounted by said base, a second bed plate mounted on said rails for travel longitudinally therealong, an upper base mounted on the second bed plate for adjustment about a vertical pivot, means for locking it at different positions of adjustment, standards on the upper base, an arm hingedly mounted by the standards to swing vertically, an arbor mounted at the swinging end of the arm, revolving tools carried by the arbor, means on the arm for driving the arbor, and adjustable means for controlling the extent of up and down movement of the arm.

16. In a device of the class described, a base, a saw table hingedly attached to the base and having a slot therein, an arm hingedly attached to the base beneath the table to swing in a vertical plane, an arbor mounted transversely of the arm at its swinging end, a motor on the arm for driving the arbor, a saw mounted by the arbor and operable through the slot in the table, means attached to the table for securing the arm at fixed positions to support the saw at different heights within the slot and an electric lamp mounted on the arm for illuminating the work.

17. In combination, a base, an arm hingedly attached thereto for vertical movement, an arbor mounted by the arm at its swinging end, a circular saw at one end of the arbor, a wood working tool at the other end, a saw table having a slot through which the saw may be operated by upward lifting of the arm, and a moulder bed across which work may be passed to the said wood working tool and the latter engaged therewith by downward movement of the arm.

18. A device as in claim 17 wherein means is provided for determining extent of movement of the arm.

19. In a machine of the character described, a bed plate, a gauge rail fixed rigidly thereto, a base mounted on the bed plate for rotative movement about a vertical pivot, an arm hingedly mounted on the base to swing in a vertical plane across the gauge rail, a saw at the end of the arm for cutting pieces disposed against the rail, and a lamp mounted on the arm between the saw and the pivot point of the arm and adapted to illuminate the piece worked on along the plane of the saw.

20. In a machine of the character described, a bed plate, a gauge rail fixed rigidly thereto, a base mounted for rotative movement about a vertical axis on said bed plate, an arm hingedly mounted upon the base to swing in a vertical plane across the gauge rail, a circular saw mounted at the end of the arm for cutting pieces disposed against the gauge rail and means on the arm for driving the saw, and a gauge member adjustably fixed to the arm cooperating with the gauge rail on pieces cut against said gauge rail.

21. In a machine of the character described, a bed plate, a gauge rail fixed rigidly thereto, a base mounted for rotative movement about a vertical axis on said bed plate, an arm hingedly mounted upon the base to swing in a vertical plane across the gauge rail, a circular saw mounted at the end of the arm for cutting pieces disposed against the bed plate flange, a motor for driving the saw and an independent rabbeting depth gauge fixed adjustably to the hand guard of the arm on one side thereof and rabbeting depth gauge adjustable crosswise of the arbor arm and plane of the saw on the other side of the arm, both gauges acting independently of each other.

LADISLAUS ZACHARA.